US012766827B2

(12) United States Patent
Koshikawa et al.

(10) Patent No.: US 12,766,827 B2
(45) Date of Patent: Oct. 20, 2026

(54) LIQUID EJECTION HEAD AND LIQUID EJECTION APPARATUS

(71) Applicant: CANON KABUSHIKI KAISHA, Tokyo (JP)

(72) Inventors: Hiroshi Koshikawa, Kanagawa (JP); Keisuke Iinuma, Kanagawa (JP); Keiichiro Tsukuda, Kanagawa (JP); Tatsuo Nanjo, Kanagawa (JP); Takashi Hayasaka, Kanagawa (JP); Masato Noda, Kanagawa (JP); Wataru Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 18/598,785

(22) Filed: Mar. 7, 2024

(65) Prior Publication Data

US 2024/0300236 A1 Sep. 12, 2024

(30) Foreign Application Priority Data

Mar. 8, 2023 (JP) ................................ 2023-035794

(51) Int. Cl.

| | |
|---|---|
| ***B41J 2/045*** | (2006.01) |
| ***B41J 2/14*** | (2006.01) |
| ***B41J 2/175*** | (2006.01) |

(52) U.S. Cl.

CPC ....... *B41J 2/04515* (2013.01); *B41J 2/17513* (2013.01); *B41J 2002/14306* (2013.01)

(58) Field of Classification Search

CPC .... B41J 2/175; B41J 2/17506; B41J 2/17509; B41J 2/17513; B41J 2/1752; B41J 2/17523; B41J 2/17553; B41J 2002/14306; B41J 29/13

See application file for complete search history.

(56) References Cited

U.S. PATENT DOCUMENTS

| | | | | |
|---|---|---|---|---|
| 4,771,295 | A * | 9/1988 | Baker | B41J 2/17513 347/93 |
| 6,039,441 | A * | 3/2000 | Tomikawa | B41J 25/34 347/86 |
| 6,086,195 | A * | 7/2000 | Bohorquez | B41J 2/17563 347/93 |
| 6,644,796 | B2 * | 11/2003 | Olsen | B41J 2/17563 347/93 |
| 8,240,814 | B2 | 8/2012 | Saikawa et al. | |
| 8,246,146 | B2 | 8/2012 | Toda et al. | |
| 2008/0100678 | A1 * | 5/2008 | Childers | B41J 2/19 347/85 |
| 2008/0100679 | A1 | 5/2008 | Tyvoll et al. | |
| 2023/0001703 | A1 * | 1/2023 | Kawamura | B41J 2/1408 |

* cited by examiner

*Primary Examiner* — Anh T Vo
(74) *Attorney, Agent, or Firm* — Venable LLP

(57) ABSTRACT

A liquid ejection head, which is capable of efficiently dissipating heat generated at the time of liquid ejection, includes a storage portion storing liquid; an ejection portion provided with a nozzle to eject liquid and an element to generate energy to eject liquid from the nozzle; and a flow path portion having a flow path capable of supplying liquid from the storage portion to the ejection portion. In a second direction orthogonal to a first direction which is a direction of supply of liquid from the storage portion to the ejection portion, the flow path portion includes a narrow width portion shorter in width than the storage portion and the ejection portion.

17 Claims, 10 Drawing Sheets

LIQUID EJECTION HEAD AND LIQUID EJECTION APPARATUS

BACKGROUND OF THE INVENTION

Field of the Invention

This disclosure relates to a liquid ejection head and a liquid ejection apparatus.

Description of the Related Art

As a type of liquid ejection head provided in a liquid ejection apparatus capable of forming an image while ejecting liquid to a print medium, there is a so-called disposable type liquid ejection head in which an ejection portion which ejects liquid is integrated with a storage portion which stores liquid.

United States Patent Application Publication No. 2008/0100679 discloses a disposable type (cartridge type) liquid ejection head.

Incidentally, the temperature of liquid is important inside the liquid ejection head. An excessive temperature rise of liquid may result in deterioration of image quality of a formed image. In order to suppress an excessive temperature rise of liquid, it is considered that heat generated at the time of ejecting liquid (also referred to as "at the time of liquid ejection") is dissipated. However, United States Patent Application Publication No. 2008/0100679 has no mention of a feature for dissipating heat (also referred to as "radiating heat") generated at the time of liquid ejection.

SUMMARY OF THE INVENTION

This disclosure aims to provide a liquid ejection head capable of efficiently dissipating heat generated at the time of liquid ejection.

A liquid ejection head including, a storage portion storing liquid; an ejection portion provided with a nozzle to eject liquid and an element to generate energy to eject liquid from the nozzle; and a flow path portion having a flow path capable of supplying liquid from the storage portion to the ejection portion, wherein in a second direction orthogonal to a first direction which is a direction of supply of liquid from the storage portion to the ejection portion, the flow path portion includes a narrow width portion smaller in width than the storage portion and the ejection portion.

Further features of the present invention will become apparent from the following description of exemplary embodiments with reference to the attached drawings.

DESCRIPTION OF THE EMBODIMENTS

Conventional Liquid Ejection Head

Figure 1:
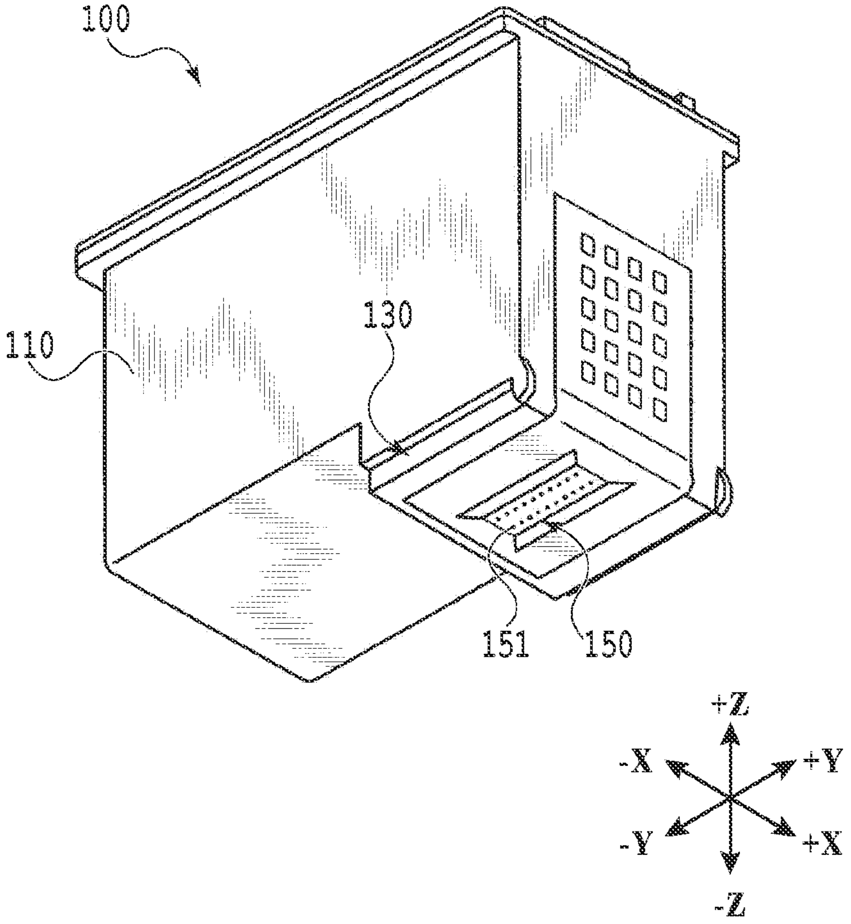
FIG. 1 is an external perspective view of a conventional liquid ejection head.

First, a conventional common example will be described with reference to FIG. 1 and FIG. 2 to facilitate understanding of the heat radiating effect of a liquid ejection head of the present embodiment.

In the drawings referred to herein, an X direction and a Y direction indicate two directions orthogonal to each other in a horizontal plane. A Z direction indicates a vertical direction. +Y, −Y, −X, +X, +Z, and −Z directions indicate the front, back, left, right, top, and bottom of a liquid ejection head, respectively. In the following description, the top, bottom, right, and left indicate directions in a mounting posture in which a liquid ejection head is mounted on a liquid ejection apparatus in a normal state unless otherwise specified.

A "print medium" herein includes not only paper used in a common liquid ejection apparatus but also anything capable of accepting liquid such as cloth, plastic film, metal plate, glass, ceramic, resin, wood, and leather.

Ink is described herein as an example of "liquid." However, liquid usable in a liquid ejection head of this disclosure is not limited to ink. More specifically, the liquid may be any of various recording liquids including a processing liquid used to improve ink fixing ability, reduce glossy unevenness, or improve scratch resistance in a print medium.

FIG. 1 is an external perspective view of a conventional liquid ejection head 100.

As shown in FIG. 1, the liquid ejection head 100 comprises a storage portion 110 capable of storing liquid therein, an ejection portion 150 capable of ejecting liquid to a print medium, and a flow path portion 130 capable of establishing liquid communication between the storage portion 110 and the ejection portion 150.

The liquid ejection head 100 of the present embodiment is a so-called disposable type liquid ejection head in which the storage portion 110 and the ejection portion 150 are integrally formed. The liquid ejection head 100 is attachable to and detachable from a liquid ejection apparatus (not shown). The liquid ejection head 100 ejects liquid from the ejection portion 150 using an inkjet ejection principle. The flow path portion 130 is configured to supply liquid from the storage portion 110 to the ejection portion 150.

Liquid supplied to the ejection portion 150 is ejected from a nozzle 151 by the action of an element capable of generating energy for ejecting liquid. In this example, a plurality of nozzles 151 are arrayed at intervals of about 0.042 mm in a longitudinal direction of the ejection portion 150. The nozzle density in this example is 600 dpi.

The flow path portion 130, the storage portion 110, and a part of the ejection portion 150 are manufactured by molding resin. Molding using resin makes a processing step relatively simple and enables manufacture of a complex shape. A manufacturing cost can also be reduced.

Figure 2:
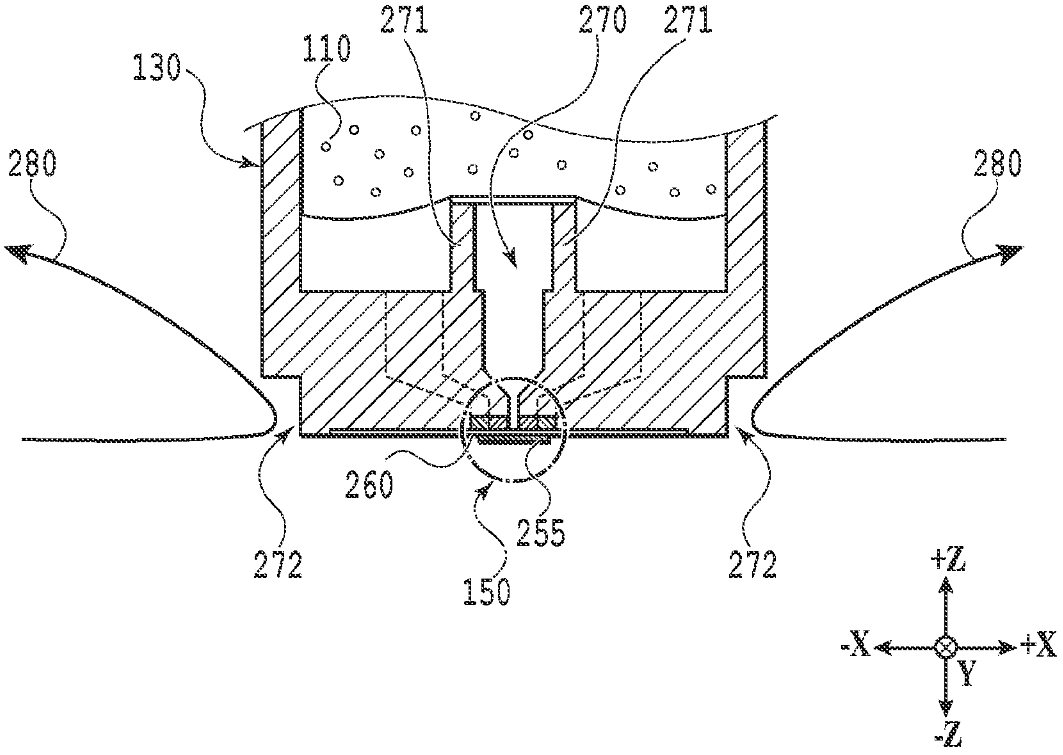
FIG. 2 is a schematic cross-sectional view of a conventional flow path portion.

FIG. 2 is a schematic cross-sectional view of a conventional flow path portion 130.

As shown in FIG. 2, the ejection portion 150 comprises a printing element board 255 provided with elements for generating energy for ejecting liquid and a bonding surface 260 for directly bonding the printing element board 255.

In this example, the printing element board 255 is provided with heaters (not shown) for generating heat energy for ejecting liquid. In order to directly affix the printing element board 255 to the bonding surface 260 with an adhesive, the bonding surface 260 is formed to have relatively high flatness. Further, the flow path portion 130 is molded to have a liquid chamber 270 capable of supplying liquid from the storage portion 110 to the printing element board 255. Liquid is supplied from the storage portion 110 to the printing element board 255 through the liquid chamber 270 and the heaters are driven, whereby the liquid is ejected from the nozzles described above. Accordingly, in this example, heat is transmitted from the printing element board 255 to the liquid chamber 270 by driving of the heaters.

Heat Radiating Effect in this Example

The conventional liquid ejection head configured as described above is mounted on a carriage (not shown) with a step 272 formed at a lower end (end in the −Z direction) of the flow path portion 130 exposed to the atmosphere in the liquid ejection apparatus. A conventional liquid ejection apparatus comprises a control unit which causes the liquid ejection head to eject liquid while reciprocally moving the carriage in main scan directions (±X directions). The liquid ejection apparatus forms an image by ejecting liquid from the nozzles while reciprocally moving the carriage in the main scan directions (±X directions). This operation will be referred to as "printing operation" as appropriate.

Thus, by the reciprocal movement of the carriage, the step 272 can be brought into contact with the atmosphere and the heat generated in the printing operation can be radiated to some extent. Arrows 280 in FIG. 2 indicate flows in a case where the lower ends of both walls of the flow path portion 130 contact the atmosphere at the time of liquid ejection.

As shown in FIG. 2, however, in the flow path portion 130 of the comparative example, side walls 271 of the liquid chamber 270 are far from the atmosphere even in a case where the reciprocate movement is performed. Further, the step 272 formed at the lower end of the flow path portion 130 has a relatively small depth (length in the X direction). Additionally, a thickness between the side wall of the step 272 and an inner peripheral surface of the liquid chamber 270 (length in the X direction) is relatively large.

Accordingly, in the conventional liquid ejection head, heat cannot be dissipated from the liquid chamber 270, which has a relatively high temperature at the time of liquid ejection, to the liquid ejection apparatus, which is lower in temperature than the liquid chamber 270, and a sufficient heat radiating effect cannot be achieved even in a case where the reciprocate movement is performed. That is, with the above configuration, the temperature of the ejection portion 150 and the liquid chamber 270 is easy to rise and difficult to drop at the time of liquid ejection.

In particular, in a case where a high-duty continuous printing operation or the like is performed, there is a possibility of an excessive temperature rise of the ejection portion 150 and the liquid chamber 270. Under such circumstances, it is difficult to further increase the number of nozzles and the nozzle density.

Here, in a case where the liquid ejection head is a so-called permanent type liquid ejection head, the heat generated at the time of liquid ejection can be dissipated by providing a heat radiating member having relatively high thermal conductivity on the bonding surface. However, providing the heat radiating member increases a manufacturing cost and cost efficiency cannot be achieved in a liquid ejection head required to be manufactured at low cost.

In addition, in a case where the temperature of the ejection portion exceeds a predetermined value, it is expected that the heat generated at the time of liquid ejection can be dissipated by increasing the number of scans and providing a wait time in the printing operation. However, such operations decrease a printing speed and an increase in frequency of these operations leads to a decrease in product value of the liquid ejection apparatus.

Thus, this disclosure provides a liquid ejection head capable of efficiently dissipating heat generated at the time of liquid ejection.

First Embodiment

Figure 3:
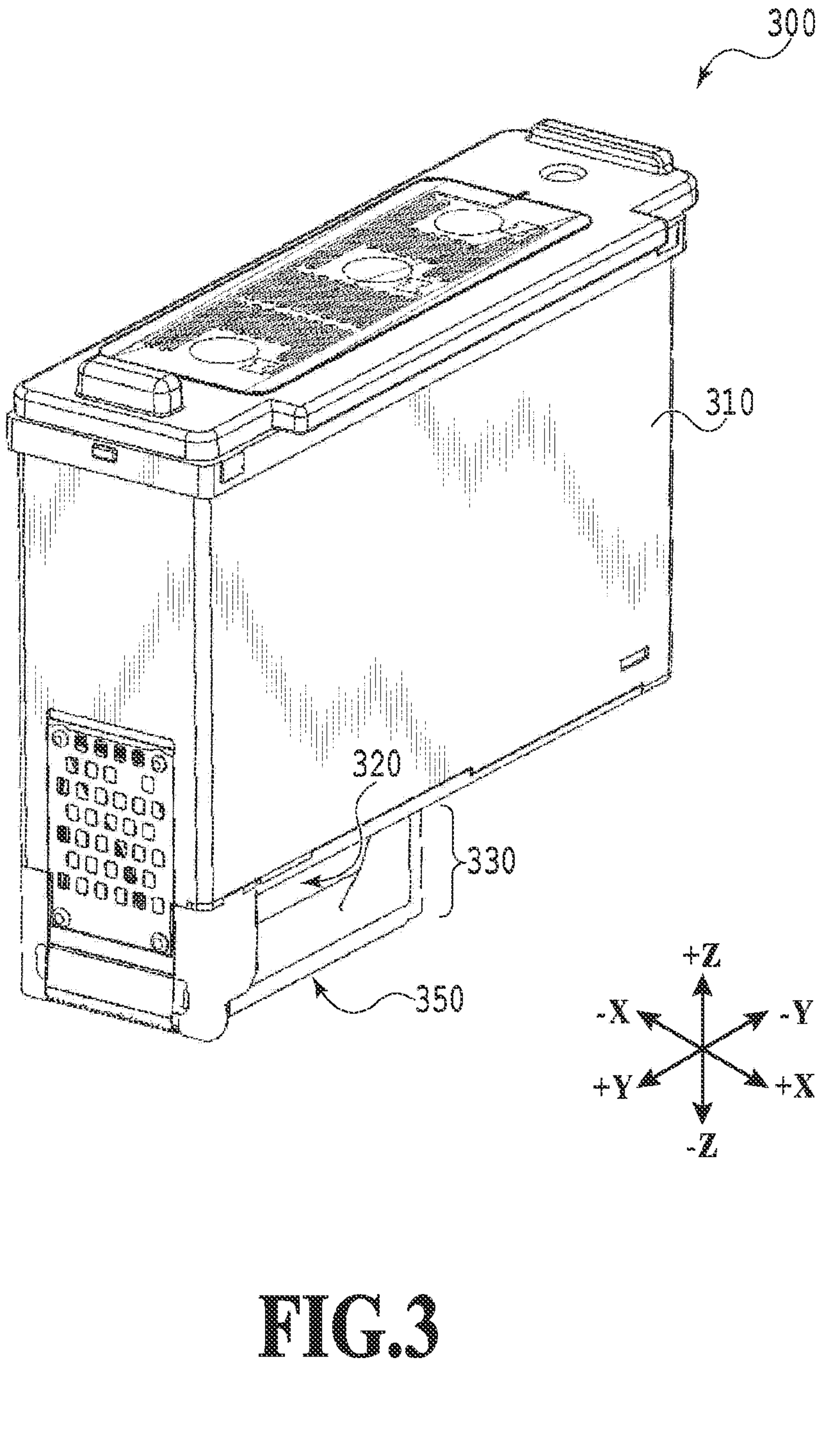
FIG. 3 is an external perspective view of a liquid ejection head according to an embodiment.

FIG. 3 is an external perspective view of a liquid ejection head 300 in the present embodiment.

As shown in FIG. 3, the liquid ejection head 300 comprises a storage portion 310 capable of storing liquid therein, an ejection portion 350 capable of ejecting liquid to a print medium, and a flow path portion 330 capable of establishing liquid communication between the storage portion 310 and the ejection portion 350.

The liquid ejection head 300 of the present embodiment is a so-called disposable type liquid ejection head in which the storage portion 310 and the ejection portion 350 are integrally formed. The liquid ejection head 300 is attachable to and detachable from a liquid ejection apparatus (not shown). The liquid ejection head 300 ejects liquid from the ejection portion 350 using an inkjet ejection principle. The flow path portion 330 is configured to supply liquid from the storage portion 310 to the ejection portion 350.

Liquid supplied to the ejection portion 350 is supplied to a plurality of nozzles (not shown) formed in the ejection portion 350. The liquid supplied to the nozzles is ejected from the nozzles by the action of elements (heaters in the present embodiment) capable of generating energy for ejecting liquid.

In the present embodiment, the nozzles are arrayed at intervals of about 0.021 mm in a longitudinal direction of the ejection portion 350. The nozzle density in the present embodiment is 1,200 dpi. That is, in the present embodiment, the distance between the nozzles is reduced by half and the nozzle density is doubled as compared with the conventional one. Thus, it can be said that the ejection portion 350 of the present embodiment is more prone to rise in temperature than the above-described conventional ejection portion.

Also in the present embodiment, a material for the flow path portion 330, the storage portion 310, and a part of the ejection portion 350 includes resin. Thus, also in a manufacturing process of the present embodiment, the use of resin makes a processing step relatively simple and enables formation of a complex shape. A manufacturing cost can also be reduced.

In the present embodiment, the flow path portion 330 has a narrow width portion 320 which is smaller in width than the storage portion 310 and the ejection portion 350 in a second direction (for example, the X direction) orthogonal to a first direction (for example, the −Z direction) which is a direction of supply of liquid from the storage portion 310 to the ejection portion 350. The width of the liquid ejection head 300 as a whole (length in the X direction) is small in the narrow width portion 320. On the other hand, a flow path formed inside the narrow width portion 320 is substantially equal in width to a conventional one. According to this configuration, a side wall of the flow path is thinner than a conventional one and an inner peripheral surface of the flow path is located close to the atmosphere. In particular, by the reciprocal movement of the liquid ejection head 300 in the right and left directions (±X directions) at the time of liquid ejection, the atmosphere flows to a position close to the inner peripheral surface of the flow path.

Accordingly, even in a case where the liquid becomes higher in temperature than the atmosphere in the flow path formed inside the flow path portion 330 at the time of liquid ejection, the reciprocal movement of the liquid ejection head 300 makes it easy to radiate the generated heat from the narrow width portion 320.

Figure 4:
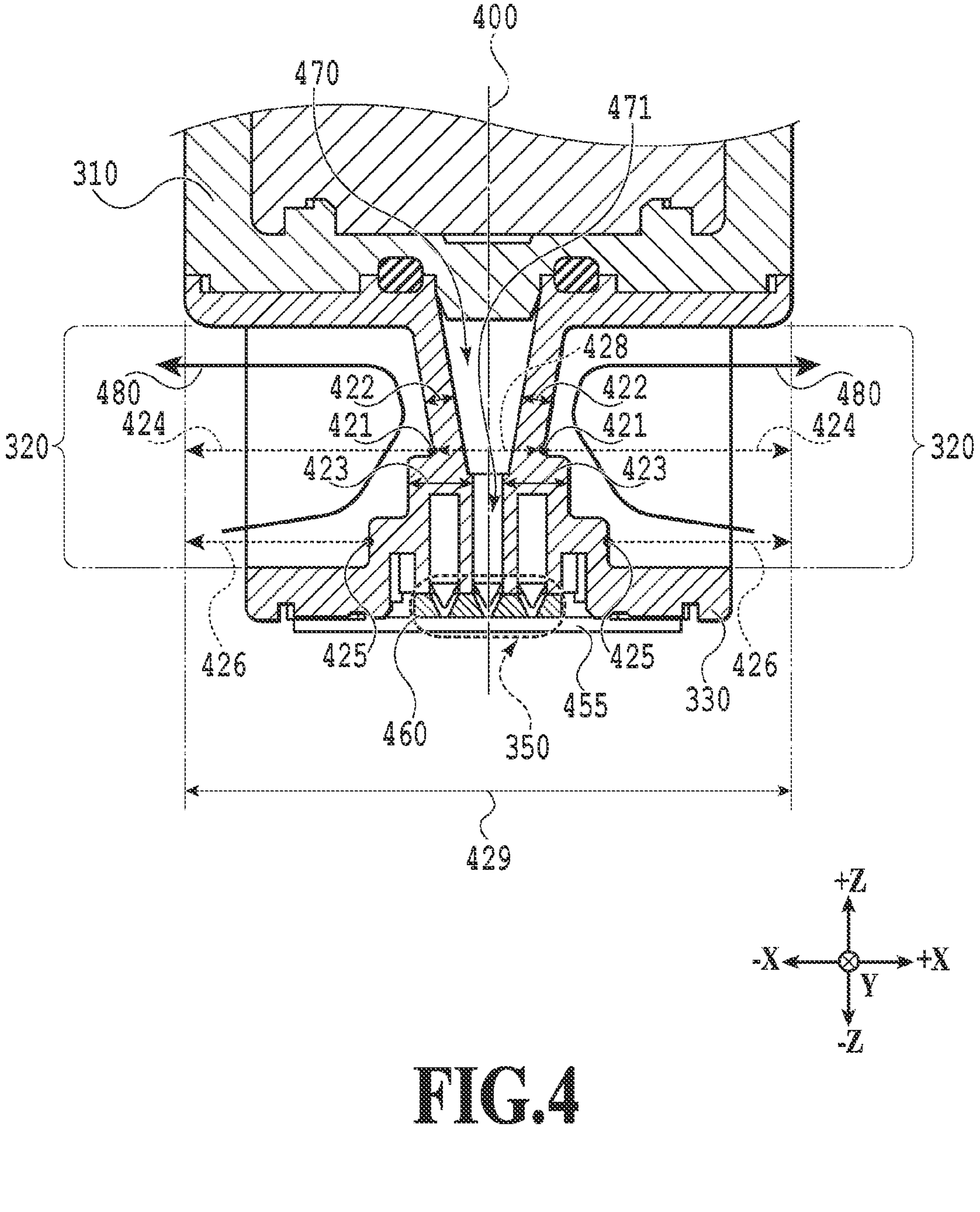
FIG. 4 is a schematic cross-sectional view of a flow path portion according to an embodiment.

FIG. 4 is a schematic cross-sectional view of the flow path portion 330 in the present embodiment.

As shown in FIG. 4, the flow path portion 330 is molded to have a flow path capable of supplying liquid from the storage portion 310 to the ejection portion 350.

Also in the present embodiment, a printing element board 455 is provided with heaters (not shown) for generating heat energy for ejecting liquid. In order to directly affix the printing element board 455 to a bonding surface 460 with an adhesive, the bonding surface 460 is formed to have relatively high flatness.

In the present embodiment, the flow path portion 330 comprises a liquid chamber 470 formed to be in liquid communication with the storage portion 310 and a supply flow path 471 formed to establish liquid communication between the liquid chamber 470 and the ejection portion 350. The supply flow path 471 is formed to have a width (length in the X direction) less than that of the liquid chamber 470 in order to efficiently supply liquid to a fine flow path formed in the printing element board 455 included in the ejection portion 350.

Liquid is supplied from the storage portion 310 to the printing element board 455 through the liquid chamber 470 and the supply flow path 471 and the heaters are driven, whereby the liquid is ejected from the nozzles described above. Accordingly, in the present embodiment, heat is transmitted from the printing element board 455 to the supply flow path 471 and the liquid chamber 470 by driving of the heaters.

Narrow Width Portion 320

In the present embodiment, the liquid ejection head 300 is mounted on a carriage (not shown) such that the narrow width portion 320 is exposed to the atmosphere inside the liquid ejection apparatus. The liquid ejection apparatus of the present embodiment further comprises a control unit which causes the liquid ejection head 300 to eject liquid while reciprocally moving the carriage in the main scan directions (±X directions). Also in the present embodiment, the liquid ejection apparatus forms an image by ejecting liquid from the nozzles while reciprocally moving the carriage in the main scan directions (±X directions). That is, the liquid ejection head 300 is configured to eject liquid while moving in the main scan directions.

According to the liquid ejection head 300 configured as described above, the heat of ink stored in the liquid chamber 470 and the supply flow path 471 can be efficiently dissipated by actively bringing the narrow width portion 320 into contact with the atmosphere in the printing operation. Incidentally, arrows 480 in FIG. 4 indicate flows of atmosphere which contact the narrow width portion 320 in a case where the carriage is reciprocally moved in the main scan directions (±X directions).

In the example of FIG. 4, the flow path portion 330 has a maximum width 429 which is the largest width (length in the X direction) and a minimum width 428 which is the smallest width in the left and right directions (±X directions). It is preferable that the minimum width 428 be equal to or less than 16% of the maximum width 429. It is also preferable that a ratio between the maximum width 429 and the minimum width 428 be 6.25:1.00 to 7.50:1.00. Moreover, it is preferable that the minimum width 428 be from 2 mm to 4 mm inclusive and the maximum width 429 be from 15 mm to 25 mm inclusive.

Furthermore, the narrow width portion 320 is formed symmetrically about a center line 400 passing the center of the liquid ejection head of the present embodiment in a transverse direction (X direction).

Additionally, a thin portion 422 at which a thickness between an outer wall of the narrow width portion 320 and an inner wall of the liquid chamber 470 is smallest is smaller in thickness than a thick portion 423 at which a thickness between the outer wall of the narrow width portion 320 and an inner wall of the supply flow path 471 is largest. It is preferable that the thickness of the thin portion 422 be equal to or less than 45% of the thickness of the thick portion 423. It is also preferable that a ratio between the thin portion 422 and the thick portion 423 be 1.00:2.25 to 1.00:2.90. Moreover, it is preferable that the thickness of the thin portion 422 be from 0.8 mm to 1.2 mm inclusive and the thickness of the thick portion 423 be from 2.3 mm to 2.7 mm inclusive.

As shown in FIG. 4, a length of the narrow width portion 320 in the left and right directions (±X directions) is not constant with respect to the liquid supply direction (−Z direction). It is preferable that a distance 424 between the endmost portion of the flow path portion 330 in the width direction and the end of the narrowest portion 421 of the narrow width portion 320 be equal to or greater than 135% of a distance 426 between the endmost portion of the flow path portion 330 and the end of the widest portion 425 of the narrow width portion 320. It is also preferable that a ratio between the distance 426 and the distance 424 be 1.00:1.35 to 1.00:1.50. Moreover, it is preferable that the distance 424 be from 7.5 mm to 9.5 mm inclusive and the distance 426 be from 5.0 mm to 7.0 mm inclusive.

As the thickness of the thin portion 422 decreases, it becomes easier to dissipate heat from the liquid chamber 470. On the other hand, if the thin portion 422 is too thin, the rigidity of the liquid chamber 470 is impaired. As the thickness of the thick portion 423 increases, it becomes easier to ensure the rigidity of the supply flow path 471 which is smaller in width than the liquid chamber 470. On the other hand, if the thick portion 423 is too thick, it is difficult to dissipate heat from the supply flow path 471.

By providing the narrow width portion 320 and forming the side wall of the flow path portion 330 into a non-flat shape as in the present embodiment, the surface area that can contact the atmosphere can be increased and the heat radiating efficiency can be improved. The narrow width portion 320 configured as described above can achieve both of the heat radiating efficiency and the rigidity for the flow path formed inside the flow path portion 330 (the liquid chamber 470 and the supply flow path 471 in the example of FIG. 4).

Figure 5:
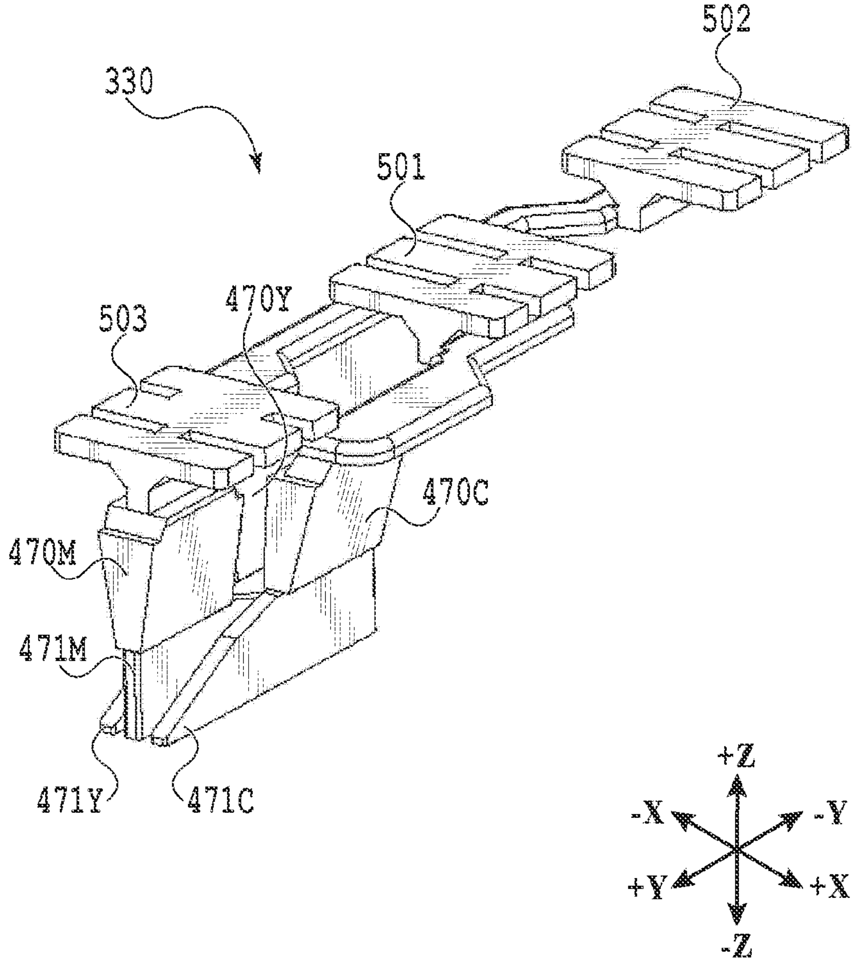
FIG. 5 is a perspective view showing a part of a flow path portion according to an embodiment.

FIG. 5 is a perspective view showing a part of the flow path portion 330 according to the present embodiment.

Although not illustrated, the above-described storage portion separately stores liquids of three colors (for example, yellow, cyan, and magenta) used for color printing which is an aspect of printing in the present embodiment. As shown in FIG. 5, the flow path portion 330 is provided with flow paths capable of separately supplying the different types of liquids, respectively, from the above-described storage portion to the above-described ejection portion. The above-described ejection portion is configured to separately eject the different types of liquids supplied from the flow path portion 330.

As shown in FIG. 5, the flow path portion 330 comprises three flow paths each configured to feed a liquid of one of the three colors used for color printing which is an aspect of printing in the present embodiment.

The flow path portion 330 is provided with a yellow flow path 502 capable of supplying a yellow ink at the rear end in FIG. 5 (−Y direction). A magenta flow path 503 capable of supplying a magenta ink is provided at the front end in FIG. 5 (±Y direction). A cyan flow path 501 capable of supplying a cyan ink is provided between the yellow flow path 502 and the magenta flow path 503.

The cyan flow path 501 includes a liquid chamber 470C and a supply flow path 471C located nearest in FIG. 5 (±X direction). The yellow flow path 502 includes a liquid chamber 470Y and a supply flow path 471Y located farthest in FIG. 5 (−X direction). The magenta flow path 503 includes a liquid chamber 470M and a supply flow path 471M located between the liquid chamber 470C and supply flow path 471C and the liquid chamber 470Y and supply flow path 471Y in the left and right directions (±X directions in the drawing).

As shown in FIG. 5, the supply flow path 471C, the supply flow path 471M, and the supply flow path 471Y are formed so as not to overlap the same axis in the back and forth directions (±Y directions in the drawing). Similarly, the liquid chamber 470C, the liquid chamber 470M, and the liquid chamber 470Y are formed so as not to overlap the same axis in the back and forth directions (±Y directions in the drawing).

In the left and right directions (±X directions in the drawing), the supply flow path 471C, the supply flow path 471M, and the supply flow path 471Y have an overlapping portion. However, since the supply flow path 471C and the supply flow path 471Y are each formed to have a surface sloping down from the back to the front, the side walls of the supply flow path 471C, supply flow path 471M, and supply flow path 471Y are in contact with the atmosphere.

In the left and right directions (±X directions in FIG. 5), the liquid chamber 470C and the liquid chamber 470Y are formed to overlap the same axis but are located at a predetermined distance. In the left and right directions (±X directions in FIG. 5), the liquid chamber 470M is formed so as not to overlap the same axis as the liquid chamber 470C and the liquid chamber 470Y.

In this manner, the liquid chambers and the supply flow paths for the three colors are arranged in a staggered configuration such that their side walls are in contact with the atmosphere as much as possible. According to this configuration, by reciprocal movement of the liquid ejection head of the present embodiment at the time of liquid ejection, the temperatures of the liquids of the respective colors flowing through the flow paths for the three colors can be equally reduced.

CONCLUSION

As described above with reference to FIG. 2 and FIG. 4, the liquid ejection head 300 of the present embodiment and the conventional liquid ejection head 100 have a commonality in that the side walls of the flow path portion are actively brought into contact with the atmosphere.

However, the conventional liquid ejection head 100 does not have a narrow width portion and has a long distance between the inner wall of the liquid chamber 270 and the atmosphere. Accordingly, even in a case where the side wall of the flow path portion 130 contacts the atmosphere, a large heat radiating effect is not expected in the liquid chamber 270. In contrast, the liquid ejection head 300 of the present embodiment comprises the narrow width portion 320 and therefore has a shorter distance between the inner wall of the liquid chamber 470 and the atmosphere than the conventional one. As a result, a large heat radiating effect is expected in the liquid chamber 470.

As described with reference to FIG. 4, the temperature of liquid in the flow path portion 330 can be reduced by the exposure of the side wall of the narrow width portion 320 to the atmosphere. In particular, the side wall of the liquid chamber 470 is thinner than the side wall of the conventional liquid chamber 270 and the temperature of the liquid chamber 470 can be actively reduced by bringing the narrow width portion 320 into contact with the atmosphere. This configuration makes it possible to sufficiently reduce the temperature of the flow path portion, which could not have been sufficiently reduced in the conventional liquid ejection head 100.

As described above, according to the liquid ejection head 300 of this disclosure, heat generated at the time of liquid ejection can be efficiently radiated. Further, since a temperature rise of liquid is suppressed, stable printing can be performed without decrease in printing quality and speed. Additionally, there is no fear of increase in cost in such a simple configuration without the need for a separate member having high thermal conductivity like the liquid ejection head 300 of this disclosure.

Modifications of First Embodiment

Modifications of the first embodiment will be described with reference to FIGS. 6A and 6B.

Figure 6A:
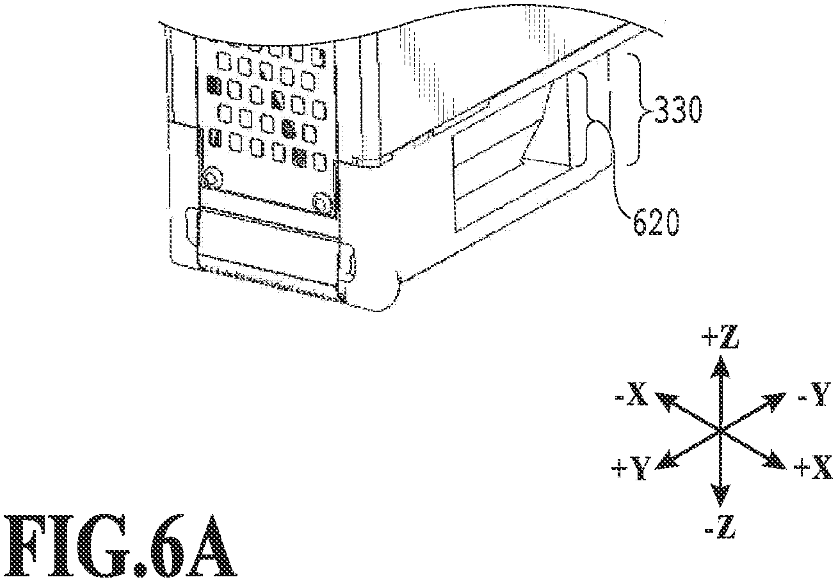
FIG. 6A is an external perspective view of a narrow width portion according to a modification.

FIG. 6A is an external perspective view of a narrow width portion 620 according to a first modification. As shown in FIG. 6A, the narrow width portion 620 may be partially provided in the back and forth directions (±Y directions). A liquid ejection head having such a narrow width portion having a relatively short length in the back and forth directions can also efficiently radiate heat generated at the time of liquid ejection.

Figure 6B:
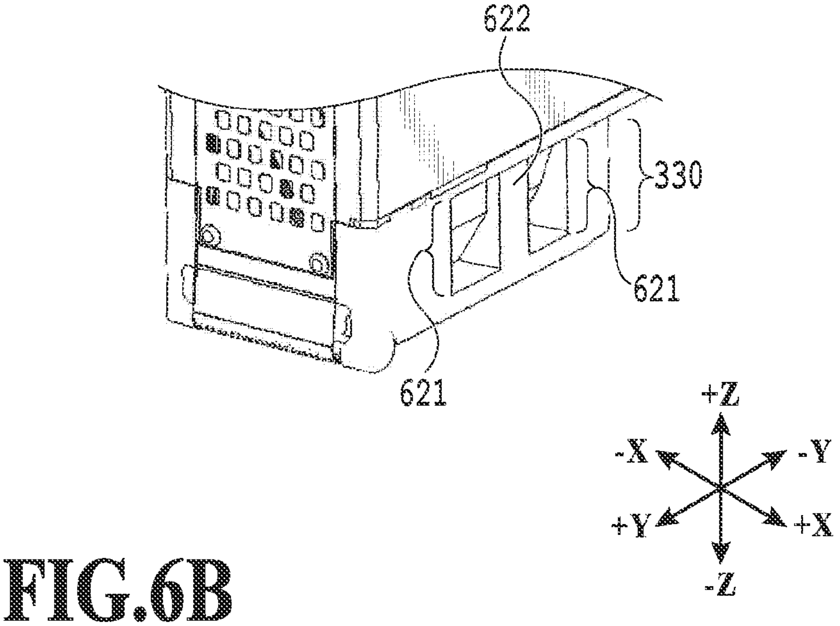
FIG. 6B is an external perspective view of narrow width portions according to a modification.

FIG. 6B is an external perspective view of a narrow width portion 621 according to a second modification. As shown in FIG. 6B, a plurality of narrow width portions 621 may be provided with a partition 622 therebetween in the back and forth directions (±Y directions). A liquid ejection head having such narrow width portions can also efficiently radiate heat generated at the time of liquid ejection.

Second Embodiment

The second embodiment of the technique of this disclosure will be described below with reference to the drawings. A difference between the liquid ejection head of the first embodiment and a liquid ejection head 700 of the present embodiment is the presence/absence of a heat radiating plate. In the following description, the difference will be mainly described while features identical or corresponding to those of the first embodiment are denoted by the same reference numbers and the description thereof is omitted. The present embodiment aims to further improve the heat radiating effect.

Figure 7:
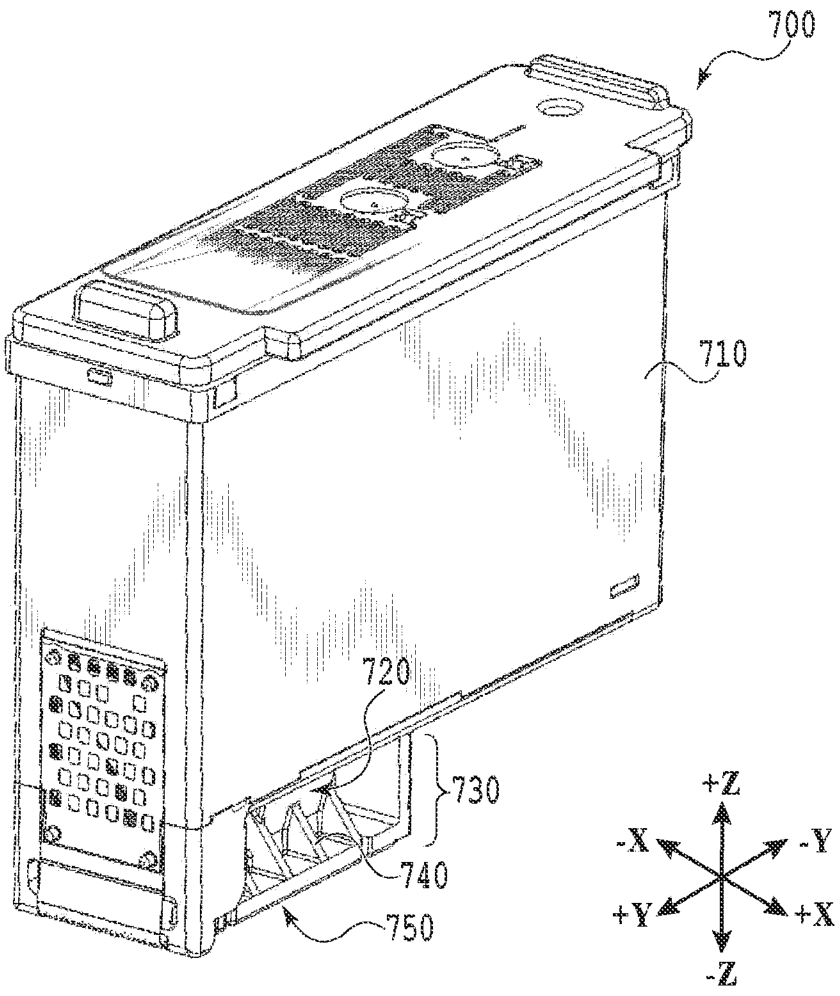
FIG. 7 is an external perspective view of a liquid ejection head according to an embodiment.

FIG. 7 is an external perspective view of the liquid ejection head 700 according to the present embodiment.

As shown in FIG. 7, the liquid ejection head 700 comprises a storage portion 710 capable of storing liquid therein, an ejection portion 750 capable of ejecting liquid to a print medium, and a flow path portion 730 capable of establishing liquid communication between the storage portion 710 and the ejection portion 750.

The flow path portion 730 of the present embodiment also comprises a narrow width portion 720. However, the narrow width portion 720 of the present embodiment is provided with polygonal ribs in contact with the side wall of the narrow width portion 720. Such ribs can be molded from resin together with the flow path portion 730. For example, by providing triangular ribs 740, the surface area of the flow path portion 730 in contact with the atmosphere can be increased and the heat radiating effect can be further improved as compared with the first embodiment. Incidentally, although a plurality of triangular ribs 740 are provided in the +Y directions in this embodiment, the number of triangular ribs 740 may be one provided that the surface area of the narrow width portion 720 can be increased.

Figure 8:
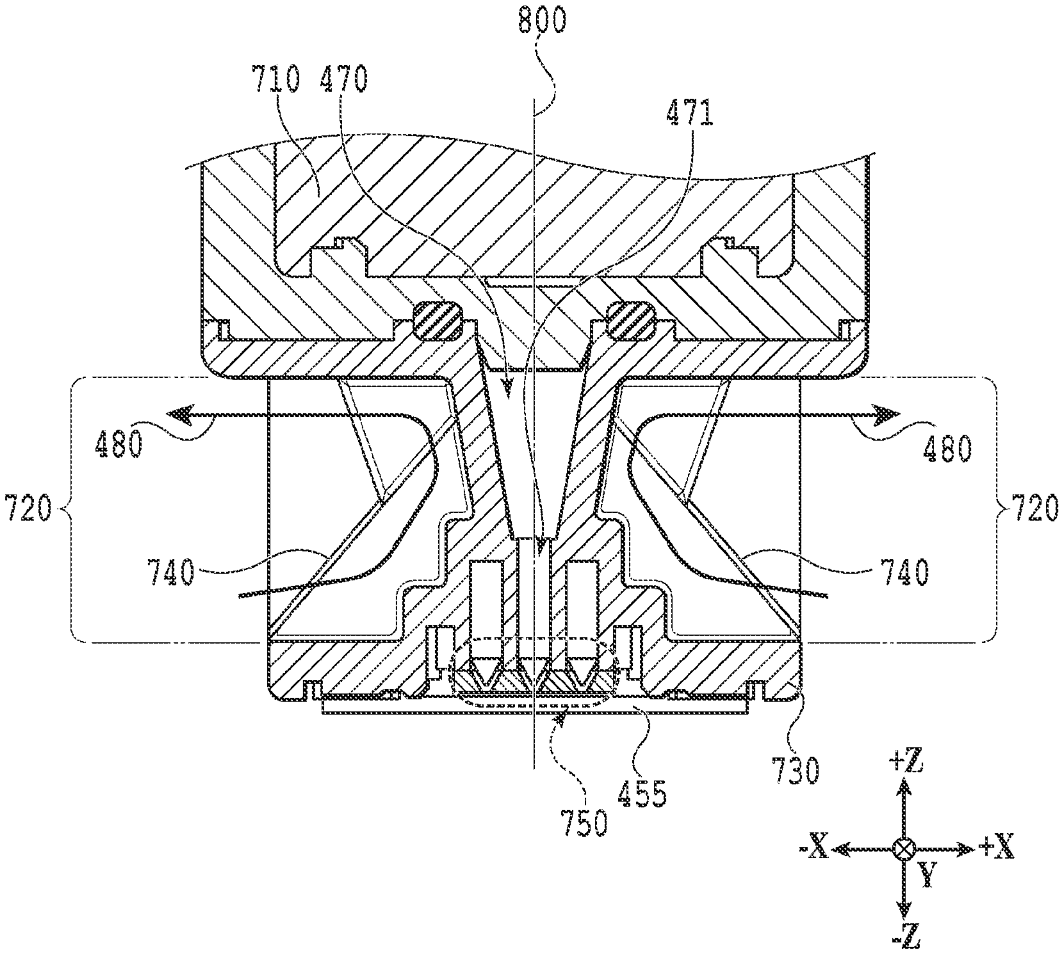
FIG. 8 is a schematic cross-sectional view of a flow path portion according to an embodiment.

FIG. 8 is a schematic cross-sectional view of the flow path portion 730 according to the present embodiment.

As shown in FIG. 8, a liquid chamber 470 is formed in the flow path portion 730 to supply liquid from the storage portion 710 to the ejection portion 750. At least two of the triangular ribs 740 are provided symmetrically about a center line 800 passing the center of the liquid ejection head of the present embodiment in the transverse direction (X direction).

According to this configuration, by reciprocal movement of the liquid ejection head of the present embodiment in the left and right directions (±X directions), the atmosphere flows into the narrow width portion 720 as shown by arrows 480. Since the triangular ribs 740 are provided, the area that can contact the atmosphere is larger than that in the case of not comprising the triangular ribs 740. Accordingly, the heat of the ejection portion 750, liquid chamber 470, and supply flow path 471 can be radiated more efficiently than the case of not comprising the triangular ribs 740.

Therefore, according to the liquid ejection head of the present embodiment, the heat radiating effect can be further improved as compared with the liquid ejection head with no triangular rib 740.

Modifications of Second Embodiment

Modifications of the rib of the second embodiment will be described below with reference to FIGS. 9A to 9C.

Figure 9A:
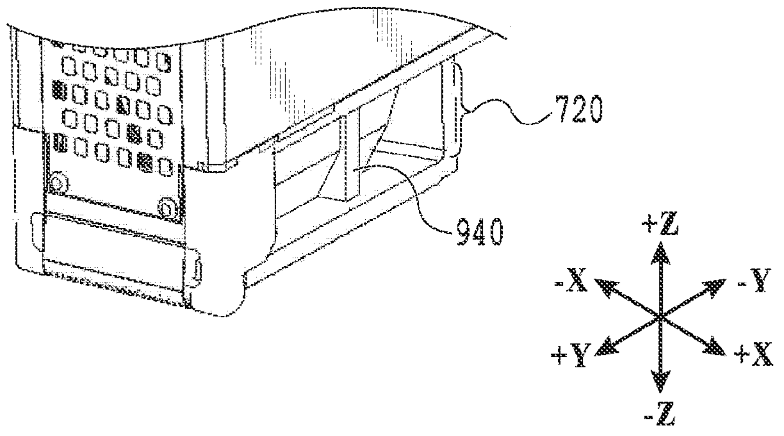
FIG. 9A is an external perspective view of a rib according to a modification.

FIG. 9A is an external perspective view of a rib 940 according to a third modification.

As shown in FIG. 9A, the shape of the rib 940 is not limited to triangle as long as the surface area of the narrow width portion 720 can be increased. For example, the shape may be a pentagon as shown in FIG. 9A. A liquid ejection head comprising such a rib 940 can also further improve the heat radiating effect.

Figure 9B:
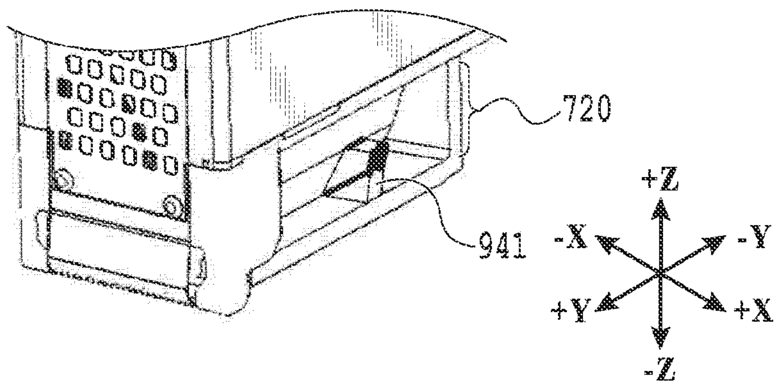
FIG. 9B is an external perspective view of a rib according to a modification.

FIG. 9B is an external perspective view of a rib 941 according to a fourth modification.

As shown in FIG. 9B, the shape of the rib 941 may be a quadrilateral (such as a trapezoid) as long as the surface area of the narrow width portion 720 can be increased. A liquid ejection head comprising such a rib 941 can also further improve the heat radiating effect.

Figure 9C:
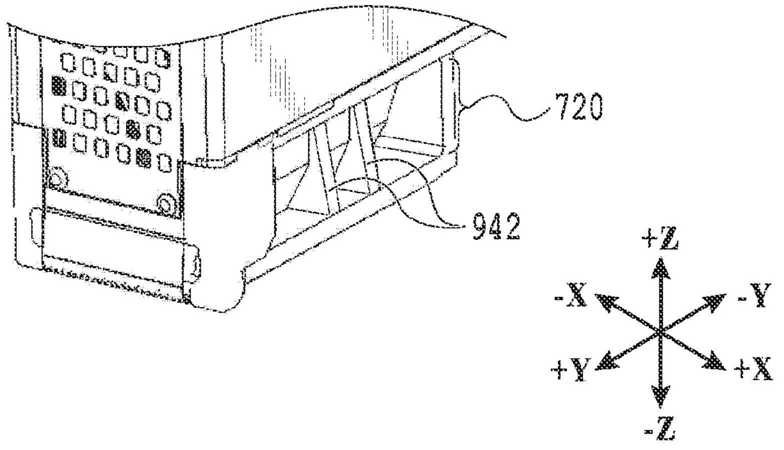
FIG. 9C is an external perspective view of ribs according to a modification.

FIG. 9C is an external perspective view of ribs 942 according to a fifth modification.

As shown in FIG. 9C, the number of polygonal ribs may be two or more as long as the surface area of the narrow width portion 720 can be increased. A liquid ejection head comprising such ribs 942 can also further improve the heat radiating effect.

Third Embodiment

The third embodiment of the technique of this disclosure will be described below with reference to the drawing. A difference between the liquid ejection heads of the embodiments described above and the liquid ejection head of the present embodiment is the type of liquid that can be ejected. In the following description, the difference will be mainly described while features identical or corresponding to those of the embodiments described above are denoted by the same reference numbers and the description thereof is omitted.

Figure 10:
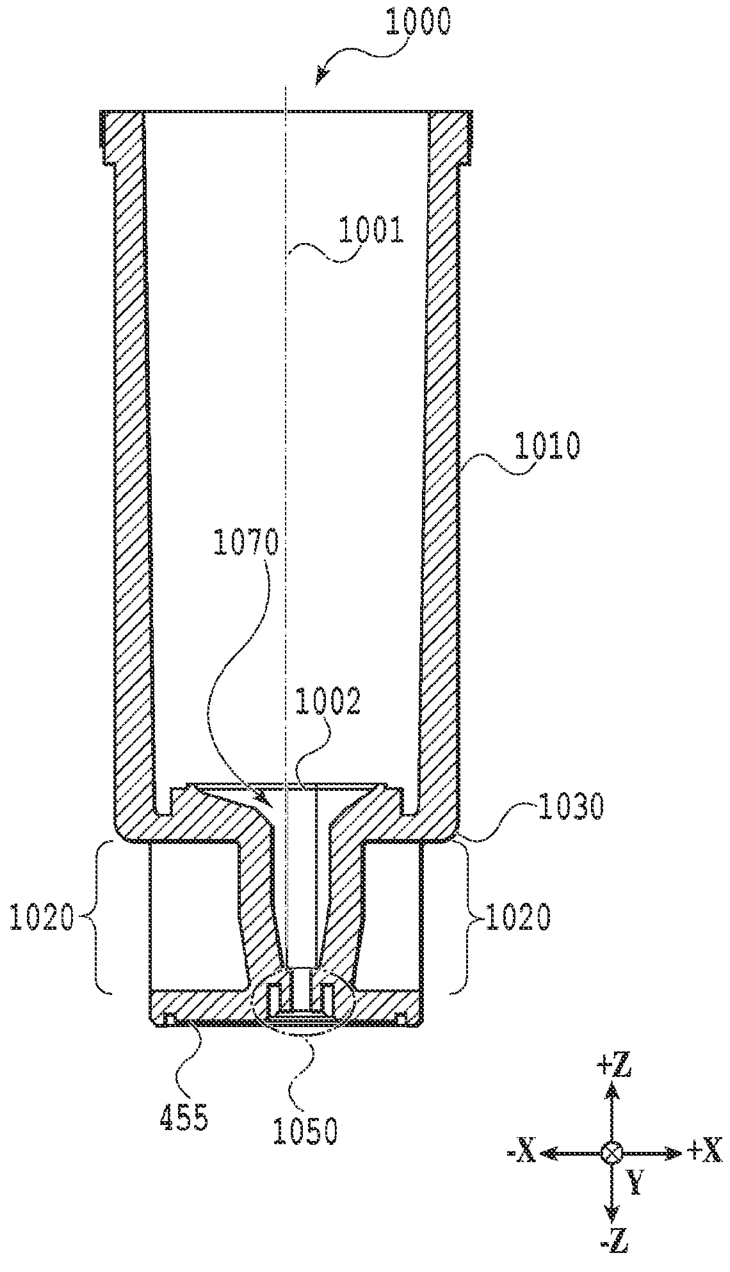
FIG. 10 is a schematic cross-sectional view of a liquid ejection head according to an embodiment.

FIG. 10 is a schematic cross-sectional diagram of a liquid ejection head 1000 according to the present embodiment. The liquid ejection head 1000 is configured to store and eject liquid used for monochrome printing (for example, black ink).

As shown in FIG. 10, the liquid ejection head 1000 comprises a storage portion 1010 capable of storing liquid therein, an ejection portion 1050 capable of ejecting liquid to a print medium, and a flow path portion 330 capable of establishing liquid communication between the storage portion 1010 and the ejection portion 1050.

In the present embodiment, a center line 1002 passing the center of the flow path in the width direction (X direction) is offset to the right in the drawing from a center line 1001 passing the center of the liquid ejection head 1000 in the transverse direction (X direction). That is, the center line 1002 passing the center of the liquid chamber 1070 is provided at a position not overlapping the center line 1001 in the width direction. Even in a case where the narrow width portion 1020 is thus formed asymmetrically about the center line 1001, the temperature of liquid in the flow path portion 1030 can be reduced by the exposure of the side wall of the narrow width portion 1020 to the atmosphere.

OTHER EMBODIMENTS

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The above embodiments show an example of a disposable type liquid ejection head having a storage chamber and an ejection portion which are replaced together in a case where the inside liquid is consumed. Another example is a permanent type liquid ejection head having an ejection portion fixed to a carriage. In this case, only a storage chamber is attachable to and detachable from the carriage. Even in the case of such a permanent type liquid ejection head, the temperature of a flow path portion can be reduced at the time of reciprocal movement as long as a narrow width portion is formed.

Further, even in the case of a full-line type liquid ejection head which does not move reciprocally, the inner peripheral surface of the liquid chamber and supply flow path can be brought close to the atmosphere by providing the narrow width portion described above. Formation of the narrow width portion also results in an uneven shape of the side wall of the flow path portion, whereby the surface area that can contact the atmosphere can be increased. As a result, the heat radiating effect can be improved. The temperature of the flow path portion can be reduced provided that the narrow width portion is comprised and exposed to the atmosphere. That is, the technique of this disclosure is also applicable to a permanent type liquid ejection head or a full-line type liquid ejection head as long as the head has a narrow width portion.

Although the above embodiments show a heater as an example of an energy generating element, the energy generating element may be a piezoelectric element as long as ejection of liquid droplets can be controlled by an electrical signal. However, the advantageous effect of the above embodiments can be exerted more excellently in the configuration comprising a heater because the temperature tends to rise in either or both of the printing element board and the liquid chamber.

According to the liquid ejection head of this disclosure, heat generated at the time of liquid ejection can be efficiently dissipated.

This application claims the benefit of Japanese Patent Application No. 2023-035794, filed Mar. 8, 2023, which is hereby incorporated by reference herein in its entirety.

What is claimed is:

1. A liquid ejection cartridge configured to be mounted on a carriage movable in main scan directions, comprising:
- a storage portion storing liquid;
- an ejection portion provided with a nozzle to eject liquid and an element to generate energy to eject liquid from the nozzle; and
- a flow path portion having a flow path capable of supplying liquid from the storage portion to the ejection portion,
- wherein the flow path portion includes a narrow width portion having a dimension shorter than that of the storage portion and the ejection portion in the main scan directions, and
- an outer side of the narrow width portion is exposed to atmosphere and an inner side of the narrow width portion is in contact with the liquid.

2. The liquid ejection cartridge according to claim 1, wherein the liquid ejection cartridge is configured to eject liquid while moving in the main scan directions.

3. The liquid ejection cartridge according to claim 1, wherein
- in the main scan directions, a minimum width of the narrow width portion is equal to or less than 16% of a maximum width of the flow path portion.

4. The liquid ejection cartridge according to claim 3, wherein
- a ratio between the maximum width and the minimum width is 6.25:1.00 to 7.50:1.00.

5. The liquid ejection cartridge according to claim 3, wherein
- the maximum width is from 15 mm to 25 mm inclusive, and
- the minimum width is from 2 mm to 4 mm inclusive.

6. The liquid ejection cartridge according to claim 1, wherein
- the narrow width portion is provided with a rib.

7. The liquid ejection cartridge according to claim 6, wherein
- the rib has a polygonal shape.

8. The liquid ejection cartridge according to claim 1, wherein
- a thickness of a thin portion at which a thickness between an outer wall of the narrow width portion and an inner wall of the flow path is thinnest is equal to or less than 45% of a thickness of a thick portion at which the thickness between the outer wall of the narrow width portion and the inner wall of the flow path is thickest.

9. The liquid ejection cartridge according to claim 8, wherein
- a ratio between the thickness of the thin portion and the thickness of the thick portion is 1.00:2.25 to 1.00:2.90.

10. The liquid ejection cartridge according to claim 8, wherein
- the thickness of the thin portion is from 0.8 mm to 1.2 mm inclusive.

11. The liquid ejection cartridge according to claim 8, wherein
- the thickness of the thick portion is from 2.3 mm to 2.7 mm inclusive.

12. The liquid ejection cartridge according to claim 1, wherein
- a first distance between an endmost portion of the flow path portion in a width direction and an end of a narrowest portion of the narrow width portion is equal to or longer than 135% of a second distance between the endmost portion and an end of a widest portion of the narrow width portion.

13. The liquid ejection cartridge according to claim 12, wherein
- a ratio between the second distance and the first distance is 1.00:1.35 to 1.00:1.50.

14. The liquid ejection cartridge according to claim 12, wherein
- the first distance is from 7.5 mm to 9.5 mm inclusive, and
- the second distance is from 5.0 mm to 7.0 mm inclusive.

15. The liquid ejection cartridge according to claim 1, wherein
- the element is a heater.

16. The liquid ejection cartridge according to claim 1, wherein
- the storage portion separately stores different types of liquids,
- the flow path portion has the flow paths capable of supplying the different types of liquids, respectively, from the storage portion to the ejection portion, and
- the ejection portion is configured to eject each of the different types of liquids.

17. A liquid ejection apparatus comprising:
- a carriage on which a liquid ejection cartridge is mountable, the liquid ejection cartridge comprising a storage portion, an ejection portion, and a flow path portion, the storage portion storing liquid, the ejection portion being provided with a nozzle to eject liquid and an element to generate energy to eject liquid from the nozzle, the flow path portion having a flow path capable of supplying liquid from the storage portion to the ejection portion, the carriage being movable in main scan directions; and
- a control unit configured to cause the liquid ejection cartridge to eject liquid,
- wherein the flow path portion includes a narrow width portion having a dimension shorter than that of the storage portion and the ejection portion in the main scan directions,
- the control unit moves the carriage in the main scan directions, and an outer side of the narrow width portion is exposed to atmosphere and an inner side of the narrow width portion is in contact with the liquid.

* * * * *